United States Patent
Karasawa et al.

(10) Patent No.: US 6,947,212 B2
(45) Date of Patent: Sep. 20, 2005

(54) TRANSMISSIVE SCREEN AND REAR PROJECTOR

(75) Inventors: Joji Karasawa, Okaya (JP); Masafumi Sakaguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/645,776

(22) Filed: Aug. 22, 2003

(65) Prior Publication Data

US 2004/0070845 A1 Apr. 15, 2004

(30) Foreign Application Priority Data

Aug. 30, 2002 (JP) ........................................ 2002-255266

(51) Int. Cl.[7] .................. G03B 21/60; G03B 21/56; G02B 3/08
(52) U.S. Cl. .................. 359/457; 359/460; 359/742
(58) Field of Search ................ 359/453, 454, 359/455, 456, 457, 460, 742

(56) References Cited

U.S. PATENT DOCUMENTS

| | | | |
|---|---|---|---|
| 4,076,384 A | 2/1978 | Deml et al. | ............ 350/122 |
| 5,074,644 A | 12/1991 | Hirai et al. | ............ 359/455 |
| 5,365,369 A | * 11/1994 | Ogino et al. | ............ 359/457 |
| 5,485,308 A | * 1/1996 | Hirata et al. | ............ 359/457 |
| 5,513,036 A | 4/1996 | Watanabe et al. | ............ 359/457 |
| 5,615,045 A | 3/1997 | Takuma et al. | ............ 359/456 |
| 2002/0080483 A1 | 6/2002 | Yamaguchi et al. | ............ 359/456 |

FOREIGN PATENT DOCUMENTS

| | | | |
|---|---|---|---|
| EP | 1 154 317 A2 | 11/2001 | ............ G03B/21/56 |
| JP | 2000-131506 | 5/2000 | ............ G02B/3/00 |
| JP | A 2002-107829 | 4/2002 | ............ G03B/21/62 |
| WO | WO 00/60412 | 10/2000 | ............ G03B/21/62 |

* cited by examiner

Primary Examiner—Judy Nguyen
Assistant Examiner—Melissa J Koval
(74) Attorney, Agent, or Firm—Oliff & Berridge, PLC (57) ABSTRACT

The invention provides a transmissive screen that can be manufactured at a low cost and show uniform diffusion and moire-free images over the entire screen, and provides a rear projector provided with such a superior transmissive screen. A transmissive screen can include a Fresnel lens portion having Fresnel-lens components on its light-exiting face and a lens array facing the light-exiting face of the Fresnel lens portion and having many lenses on its light-incident face. The transmissive screen can further include separating device for separating the Fresnel lens portion from the lens array portion at least in the periphery of the screen. Such a superior transmissive screen can be included in a rear projector.

8 Claims, 8 Drawing Sheets

Related Art

Related Art

Related Art

FIG. 8

TRANSMISSIVE SCREEN AND REAR PROJECTOR

BACKGROUND OF THE INVENTION

1. Field of Invention

The present invention relates to a transmissive screen and a rear projector.

2. Description of Related Art

Figure 7:
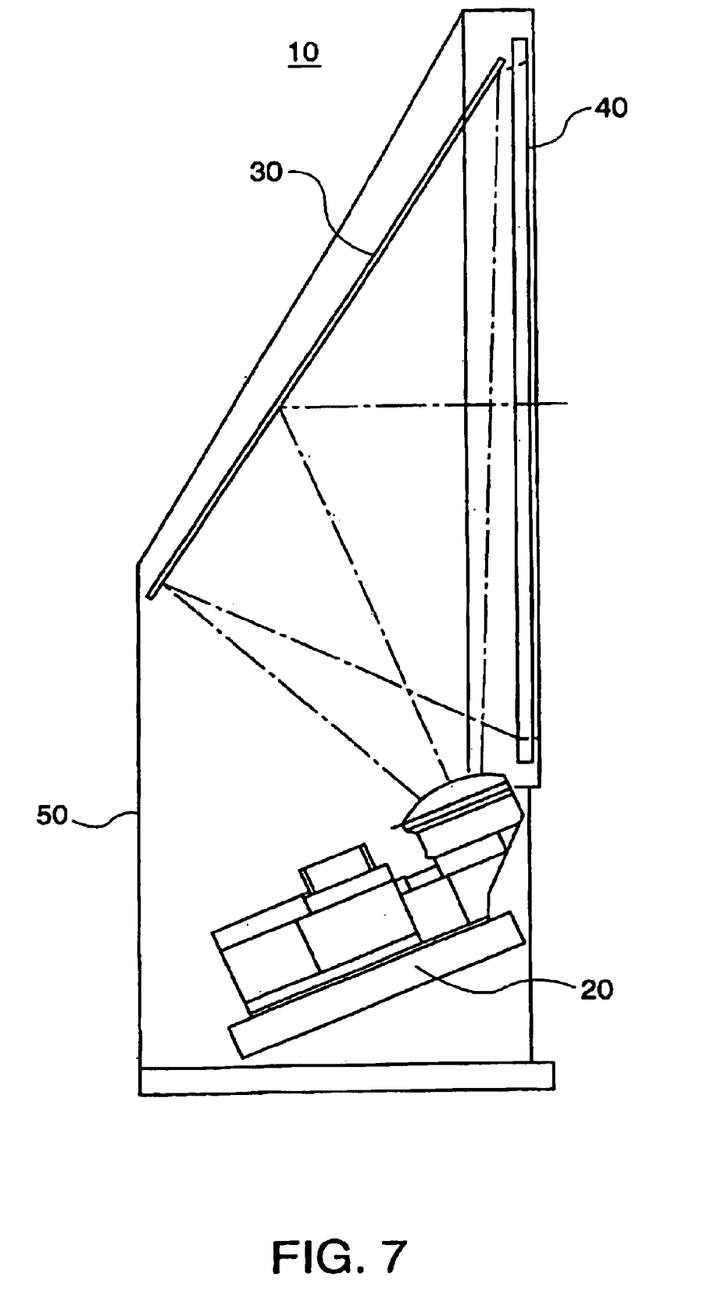
FIG. 7 shows an optical system of a conventional rear projector.

Currently, there are increasing demands for rear projectors used as displays that are suitable for home theater monitors and wide-screen television sets. For example, FIG. 7 shows an optical system of a rear projector. As shown in FIG. 7, the rear projector 10 can include a housing 50 that includes therein an optical projecting unit 20, a light-guide mirror 30 for guiding images projected by the optical projecting unit 20, and a transmissive screen 40 onto which the projected images guided by the light-guide mirror 30 are projected.

Figure 8:
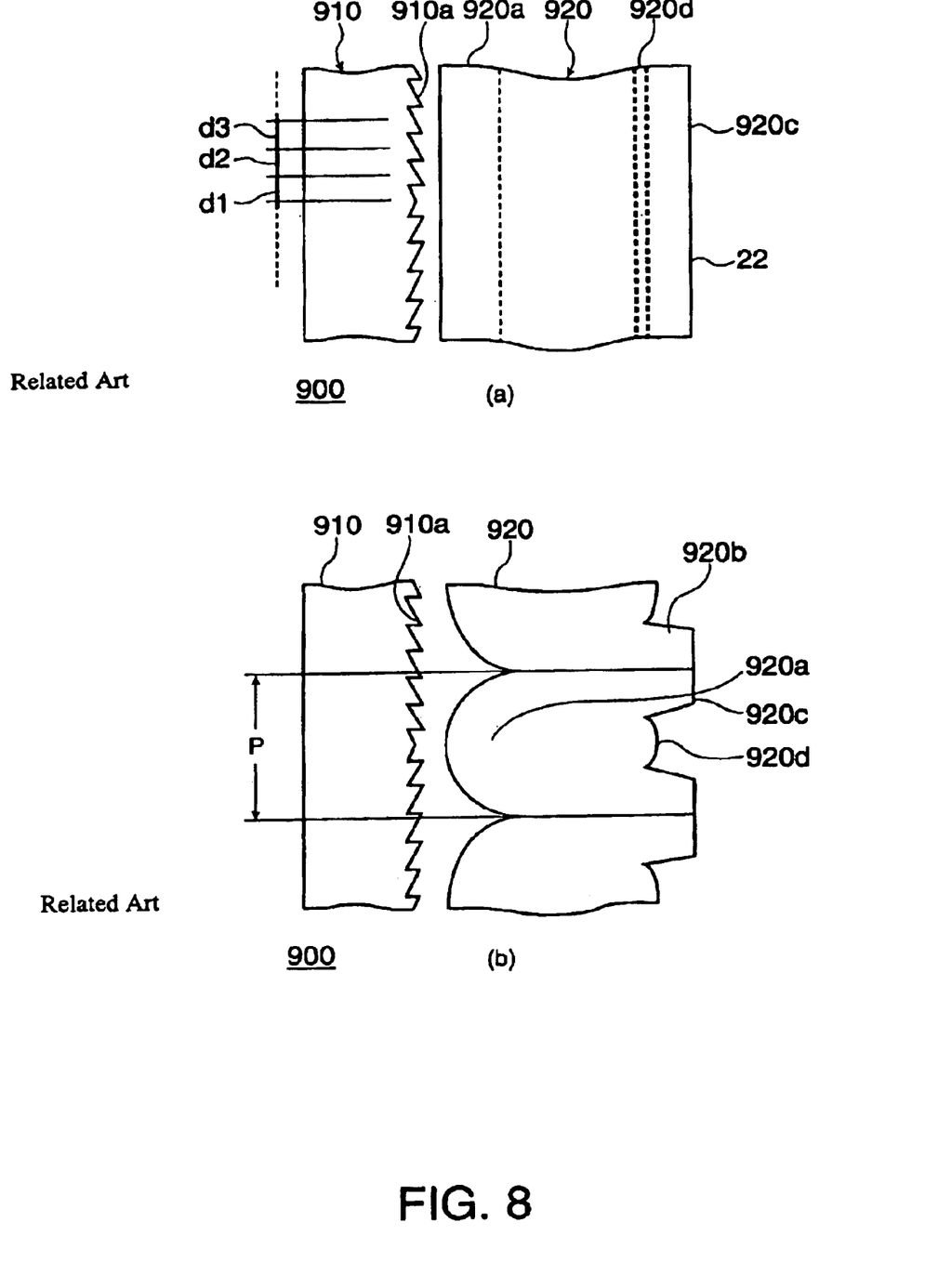
FIGS. 8(a) and 8(b) are sectional views of the conventional transmissive screen.

The transmissive screen 40 used for the rear projector 10 should not cause moire fringes on the screen. A moire-free transmissive screen is disclosed in Japanese Unexamined Patent Application Publication No. 1-319025. FIGS. 8(a) and 8(b) are sectional view of a transmissive screen 900. FIG. 8(a) is a sectional side view of the transmissive screen 900 and FIG. 8(b) is a sectional top view of the transmissive screen 900. As shown in FIGS. 8(a) and 8(b), the transmissive screen 900 can include a Fresnel lens portion 910 having Fresnel-lens components 910a on its light-exiting face, and a lenticular lens 920 facing the light-exiting face of the Fresnel lens portion 910, the lenticular lens portion 920 having many lenticular lens components 920a on its light-incident face and black stripes 920c and protrusion 920b on the light-exiting face 920d. In addition, the distance between Fresnel-lens components 910a and/or the distance between black stripes 920c are random. Such design suppresses the generation of optical interference, and therefore the generation of moire fringes on the transmissive screen 900.

Unfortunately, this transmissive screen 900 has different diffusions on different site thereon. In more detail, diffusion differs between different sites on the transmissive screen 900, because the radius of curvature and the pitch of the lenticular lens components must be determined to achieve a desired diffusion for each lenticular lens component, i.e., the pitches of the lenticular lens components are not constant over the entire screen.

Another disadvantage of the transmissive screen 900 is a difference in interference between the Fresnel-lens components and the lenticular lens components at some sites of the transmissive screen 900. Furthermore, the overlay conditions are also different for each combination of these lens components; hence, it is difficult to prevent moire fringes at every site of the transmissive screen 900.

Another disadvantage of the transmissive screen 900 is its high cost due to the complicated manufacturing required for the Fresnel-lens components and lenticular lens components.

SUMMARY OF THE INVENTION

Accordingly, an object of the present invention is to provide a transmissive screen that shows uniform diffusion over the entire screen, that suppresses the generation of moire fringes at all sites thereon, and that can be produced at a lower cost. Another object of the present invention is to provide a rear projector provided with such a superior transmissive screen.

To meet the objectives described above, a moire-free transmissive screen with uniform diffusion over the entire screen can be manufactured at a low cost by providing a separating technique for separating a Fresnel lens portion from a lens array portion by a predetermined distance. The present invention is based on such findings.

A transmissive screen according to the present invention can include a Fresnel lens portion having Fresnel-lens components on its light-exiting face and a lens array facing the light-exiting face of the Fresnel lens portion. The lens array portion can have many lenses on its light-incident face. The transmissive screen can further include a separating device for separating the Fresnel lens portion from the lens array portion at least in the periphery of the transmissive screen.

By analyzing how moire fringing is generated on the conventional transmissive screen described above, the analysis revealed that significant moire fringing is generated in the periphery of the transmissive screen. In more detail, close contact between the Fresnel-lens components and the lenticular lens components particularly in the periphery of the transmissive screen, as well as certain relationships between the pitches of the Fresnel-lens components and the pitches of the lenticular lens components, contribute to the generation of moire fringing.

For this reason, to provide a separating device for separating the Fresnel lens portion from the lens array portion at least in the periphery of the transmissive screen, where significant moire fringing occurs, prevents the Fresnel lens portion from coming into close contact with the lens array portion, thus effectively suppressing the generation of moire fringing in the periphery of the transmissive screen.

The transmissive screen according to the present invention does not require random pitches of optical elements in the Fresnel lens portion and the lens array portion for ensuring uniform diffusion over the entire transmissive screen. Furthermore, the manufacturing costs do not rise because the optical elements are not required to be randomly arranged.

In the transmissive screen according to the above, the separating device can be preferably a flat transparent plate disposed between the Fresnel lens portion and the lens array portion. Thus, moire fringing in the periphery of the transmissive screen can effectively be suppressed merely by placing the flat transparent plate between the Fresnel lens portion and the lens array portion.

This flat transparent plate preferably has a thickness of from 10 $\mu$m to 2 mm. A thickness of 10 $\mu$m or more is required to satisfactorily suppress moire fringing. In this respect, the flat transparent plate more preferably has a thickness of 30 $\mu$m or more, and most preferably has a thickness of 100 $\mu$m or more. A thickness of 2 mm or less is required to maintain a required resolution of the transmissive screen, a flat transparent plate that is excessively thick degrades the resolution of the transmissive screen. In this respect, a thickness of 1 mm or less is more preferable, and a thickness of 500 $\mu$m or less is most preferable. The flat transparent plate may suitably be formed of various resin materials, such as polycarbonate, polymethyl methacrylate, and polypropylene.

In the transmissive screen according to above, the separating means is preferably a spacer that separates the Fresnel lens portion from the lens array portion in the periphery of the transmissive screen. Thus, moire fringing in the periphery of the transmissive screen can effectively be suppressed merely by placing a spacer in the periphery of the transmissive screen to separate the Fresnel lens portion from the lens array portion.

Like the flat transparent plate described above, this spacer preferably has a thickness of 10 μm to 2 mm. A thickness of 10 μm or more is required to satisfactorily suppress moire fringing. In this respect, the spacer more preferably has a thickness of 30 μm or more, and most preferably has a thickness of 100 μm or more. On the other hand, a thickness of 2 mm or less is required to maintain a required resolution of the transmissive screen. A spacer that is excessively thick degrades the resolution of the transmissive screen. In this respect, a thickness of 1 mm or less is more preferable, and a thickness of 500 μm or less is most preferable. Like the flat transparent plate described above, the spacer may suitably be formed of various resin materials such as polycarbonate, polymethyl methacrylate, and polypropylene.

The spacer may be disposed around the entire periphery of the transmissive screen so as to surround the screen or spacers may be disposed only at the right and left edges of the screen where moire fringing is likely to occur (that is, no spacers are arranged at the top and bottom of the transmissive screen).

In the transmissive screen according to the above, the separating device is preferably a holder that separates the Fresnel lens portion from the lens array portion in the periphery of the transmissive screen. Thus, moire fringing in the periphery of the transmissive screen can effectively be suppressed merely by supporting the Fresnel lens portion and the lens array portion with a predetermined holder. The holder may be disposed around the entire periphery of the transmissive screen so as to surround the screen or holders may be disposed only at the right and left edges of the screen where moire fringing is likely to occur (that is, no holders are arranged at the top and bottom of the transmissive screen).

In the transmissive screen according to the above described, the separating device can be preferably constructed by setting back the Fresnel lens surface toward the light-incident face in the periphery of the transmissive screen. Thus, moire fringing in the periphery of the transmissive screen can effectively be suppressed merely by setting back the Fresnel lens surface of a predetermined portion in the periphery of the transmissive screen. This set back of the Fresnel lens surface preferably has a depth of 10 μm to 2 mm. A depth of 10 μm or more is required to satisfactorily suppress moire fringing. In this respect, the set back more preferably has a depth of 30 μm or more, and most preferably has a depth of 100 μm or more. On the other hand, a depth of 2 mm or less is required to maintain a required resolution of the transmissive screen. A set back that is excessively deep degrades the resolution of the transmissive screen. In this respect, a depth of 1 mm or less is more preferable, and a depth of 500 μm or less is most preferable. In order to set back the Fresnel lens surface by a predetermined depth, a metallic mold for molding the Fresnel lens is preferably provided with such a specified shape of set back in advance.

The region to be set back in the Fresnel lens surface may be arranged around the entire periphery of the transmissive screen so as to surround the screen, or may be arranged only at the right and left edges of the screen where moire fringing is likely to occur (that is, no set back is formed in the Fresnel lens surface at the top and bottom of the transmissive screen).

In the transmissive screen according to the present invention, the lens array portion may be provided with many lenticular lenses on the light-incident face.

In the transmissive screen according to the present invention, the lens array portion may be provided with many microlenses on the light-incident face.

A rear projector according to the present invention can include an optical projecting unit, a light-guide mirror, and a transmissive screen as described above.

As described above, the rear projector according to the present invention is a high-quality display, since it includes a superior transmissive screen that exhibits uniform diffusion, that suppresses moire fringing over the entire screen, and that can be manufactured at a low cost.

BRIEF DESCRIPTION OF THE DRAWINGS

The invention will be described with reference to the accompanying drawings, wherein like numbers represent the like elements, and wherein.

DETAILED DESCRIPTION OF PREFERRED EMBODIMENTS

Figure 1:
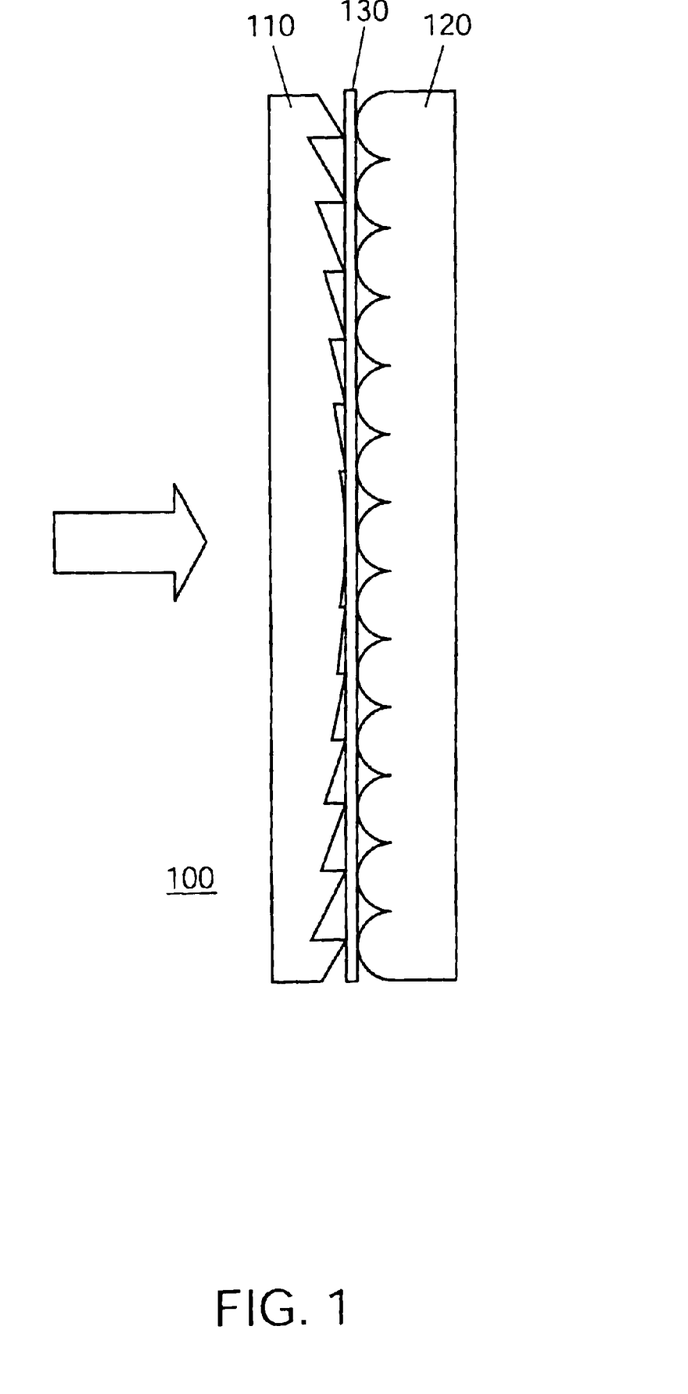
FIG. 1 is a sectional view of a transmissive screen according to a first embodiment of the present invention.

Embodiments according to the present invention will now be described with reference to the drawings. FIG. 1 is a sectional top view of a transmissive screen according to a first embodiment. As shown in FIG. 1, the transmissive screen 100 can include a Fresnel lens portion 110 having Fresnel-lens components on its light-exiting face, and a lens array portion 120 facing the light-exiting face of the Fresnel lens portion 110 and having many lenticular lenses on its light-incident face. The transmissive screen 100 can further includes a flat transparent plate 130 between the Fresnel lens portion 110 and the lens array portion 120.

The flat transparent plate 130 is disposed at least in the periphery of the transmissive screen 100, where significant moire fringing occurs, to separate the Fresnel lens portion 110 from the lens array portion 120 and prevent the Fresnel lens portion 110 from coming into excessively close contact with the lens array portion 120, thus effectively suppressing the generation of moire fringes in the periphery of the transmissive screen 100.

Figure 2:
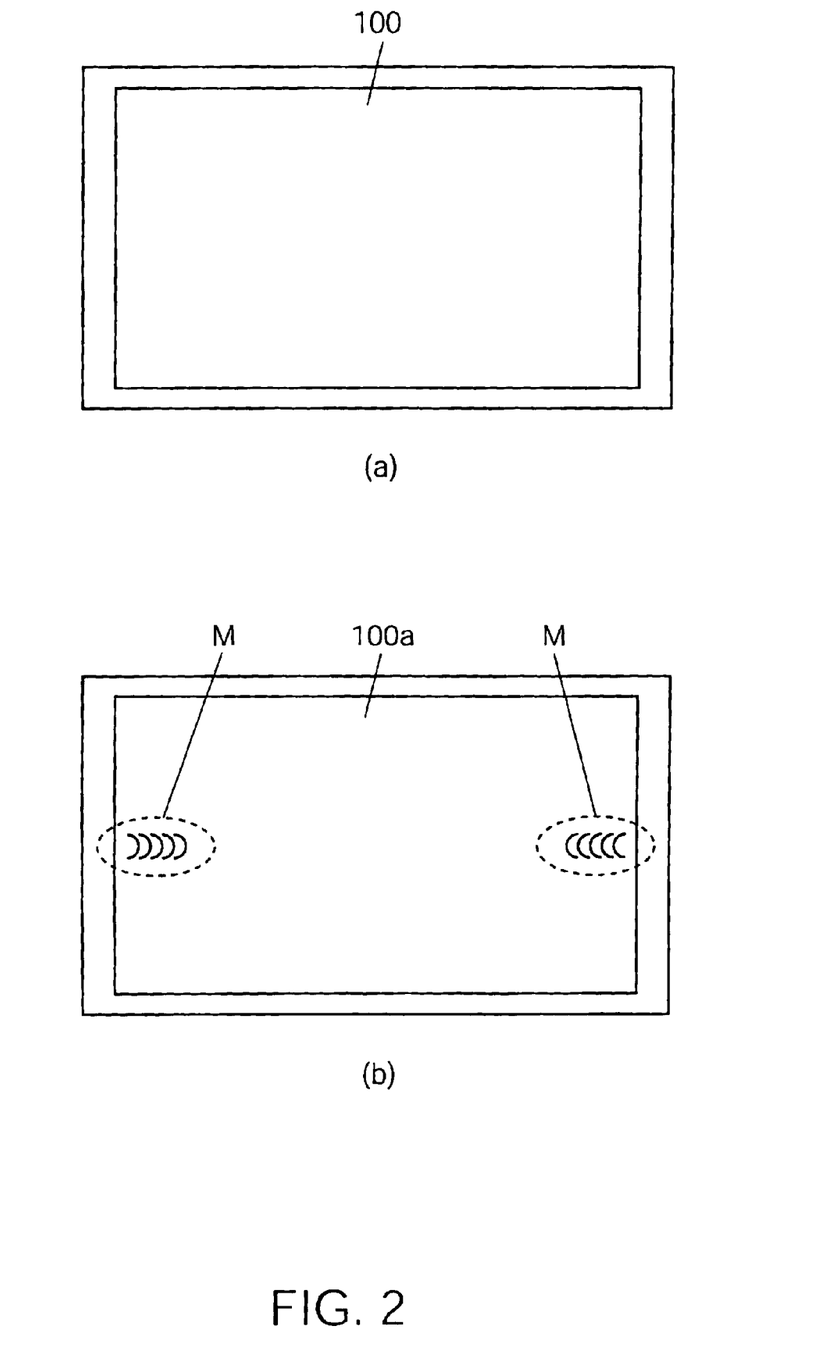
FIGS. 2(a) and 2(b) illustrate the effectiveness of the transmissive screen according to the first embodiment of the present invention.

FIGS. 2(a) and 2(b) show how effectively the transmissive screen 100 according to the first embodiment works. FIG. 2(a) shows the transmissive screen 100 according to the first embodiment. FIG. 2(b) shows a transmissive screen 100a without the flat transparent plate. As shown in FIGS.

2(*a*) and 2(*b*), the transmissive screen 100 according to the first embodiment does not suffer from moire fringing, unlike the transmissive screen 100*a* without the flat transparent plate, which shows moire fringing.

Another advantage is that the transmissive screen 100 according to the first embodiment does not need to have random pitches of the optical elements included in the Fresnel lens portion 110 and the lens array portion 120, thus providing uniform diffusion over the entire display area of the transmissive screen 100. A further advantage of the transmissive screen 100 is that it does not increase the manufacturing cost, since the optical elements do not need to have random pitches in the Fresnel lens portion 110 and the lens array portion 120.

The flat transparent plate 130 used is a polymethyl methacrylate film with a thickness of 300 μm. It has antireflection coatings on both surfaces thereof.

Figure 3:
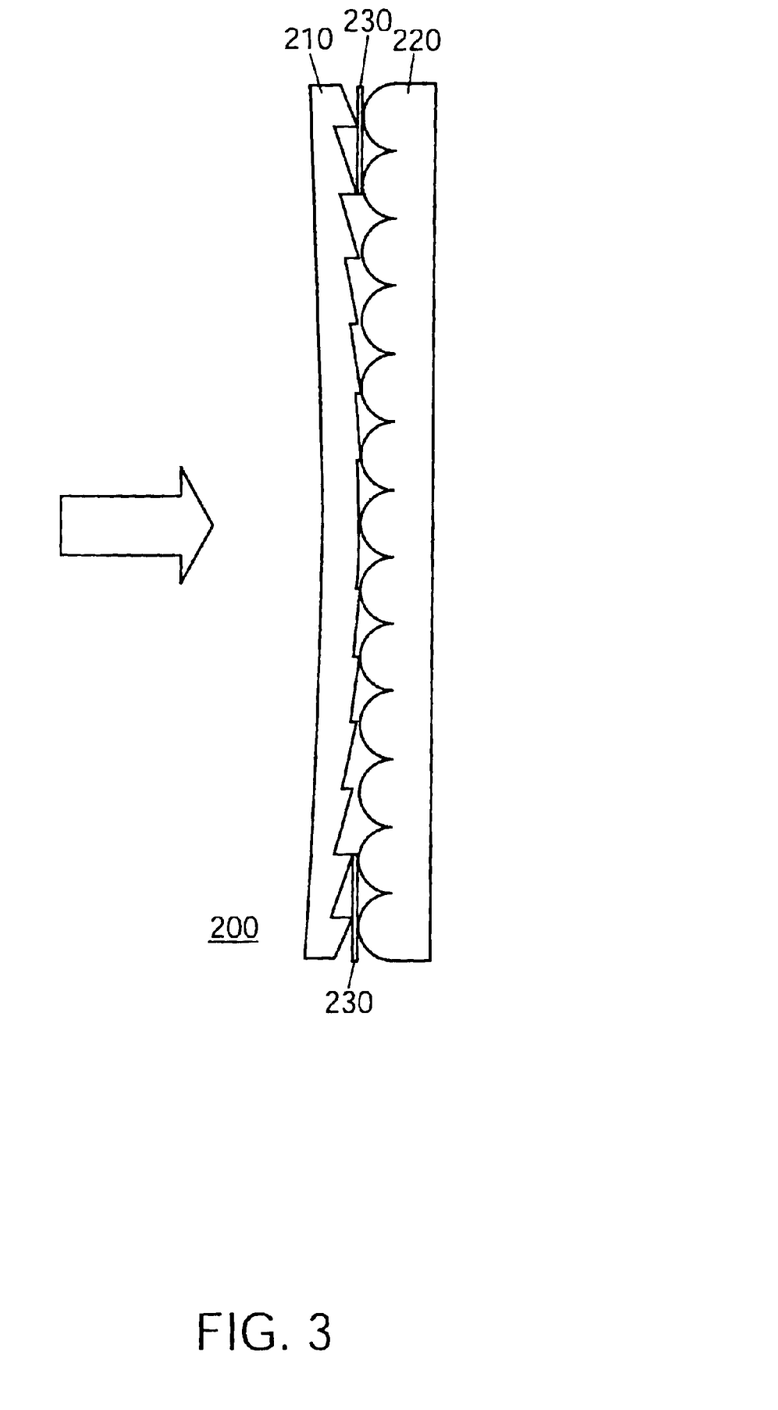
FIG. 3 is a sectional view of a transmissive screen according to a second embodiment of the present invention.

FIG. 3 is a sectional top view of a transmissive screen according to a second embodiment. As shown in FIG. 3, the transmissive screen 200 can include a Fresnel lens portion 210 having Fresnel-lens components on its light-exiting face and a lens array portion 220 facing the light-exiting face of the Fresnel lens portion 210 and having many lenticular lenses on its light-incident face. The transmissive screen 200 further includes a spacer 230 in the periphery of the transmissive screen 200 to separate the Fresnel lens portion 210 from the lens array portion 220. Thus, moire fringing in the periphery of the transmissive screen 200 can effectively be suppressed merely by placing the spacer 230 in the periphery of the transmissive screen 200 to separate the Fresnel lens portion 210 from the lens array portion 220.

In the second embodiment, the spacer 230 is formed of polycarbonate with a thickness of 300 μm. The spacer 230 has antireflection coatings on both surfaces thereof. The spacer 230 may be disposed around the entire periphery of the transmissive screen 200 so as to surround the screen, or may be disposed only at the right and left edges of the screen 200 where moire fringing is likely to occur (that is, spacers 230 are not arranged at the top and bottom of the transmissive screen 200).

The spacers 230 may be disposed outside the display area of the transmissive screen 200. Then, the spacers 230 neither need to be transparent nor require antireflection coating. The spacers 230 have a thickness of 2 mm to ensure that the Fresnel lens portion 210 is separated from the lens array portion 220 in the area where moire fringing easily occurs.

The Fresnel lens portion 210 is preferably cambered to form a convex surface on the light-exiting face. Immediately after the Fresnel lens portion 210 is molded, it is left on a camber template to form a convex surface thereon. By providing such a convex surface, the Fresnel lens portion 210 and the lens array portion 220 are not in contact with each other in the periphery of the screen to suppress moire fringing, whereas the Fresnel lens portion 210 and the lens array portion 220 are in contact with each other in the inner area than the periphery of the screen to enhance the resolution of images. It should be understood that the lens array portion 220 may be cambered alone or both the Fresnel lens portion 210 and the lens array portion 220 may be cambered.

Figure 4:
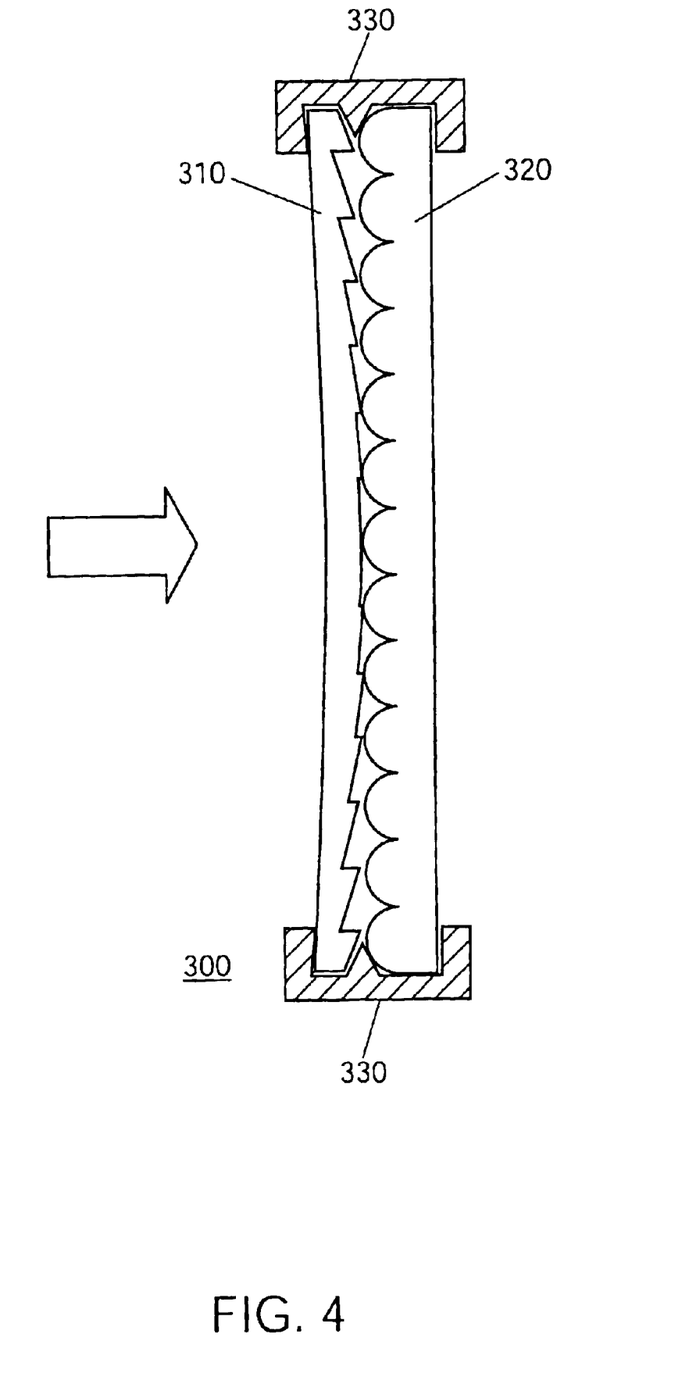
FIG. 4 is a sectional view of a transmissive screen according to a third embodiment of the present invention.
Figure 5:
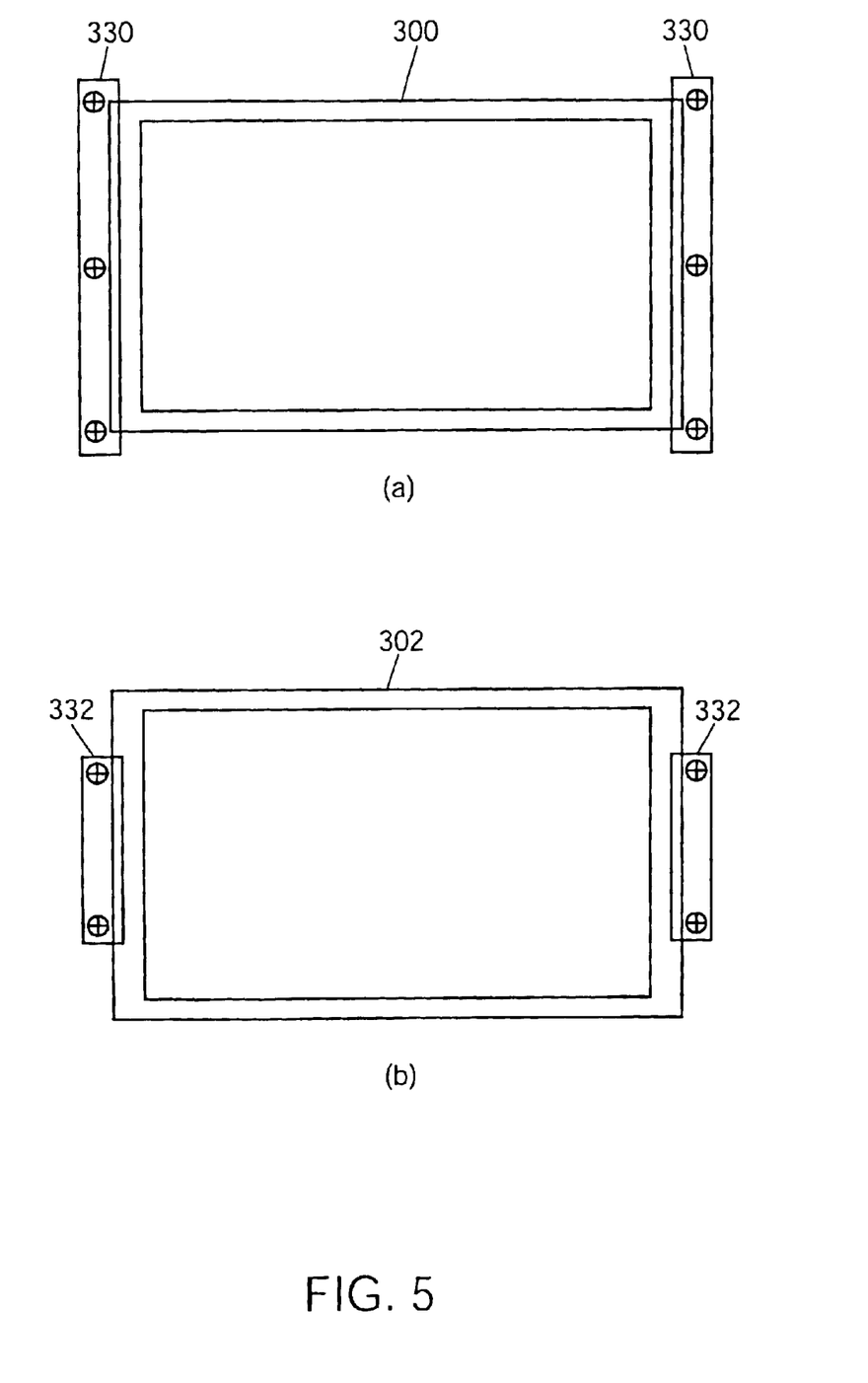
FIGS. 5(a) and 5(b) are plan views of the transmissive screen according to the third embodiment of the present invention.

FIG. 4 is a sectional top view of a transmissive screen according to a third embodiment. FIGS. 5(*a*) and 5(*b*) are plan views of the transmissive screen according to the third embodiment. As shown in FIGS. 4, 5(*a*), and 5(*b*), the transmissive screen 300 can include a Fresnel lens portion 310 having Fresnel-lens components on its light-exiting face and a lens array portion 320 facing the light-exiting face of the Fresnel lens portion 310 and having many lenticular lenses on its light-incident face. The transmissive screen 300 further includes a holder 330, functioning as separating device, in the periphery of the transmissive screen 300 to separate the Fresnel lens portion 310 from the lens array portion 320. Thus, moire fringing in the periphery of the transmissive screen 300 can effectively be suppressed merely by supporting the Fresnel lens portion 310 and the lens array portion 320 with the holder 330.

The holder 330 may be disposed around the entire periphery of the transmissive screen 300 so as to surround the screen or holders 330 may be disposed only at the right and left edges of the screen 300 where moire fringing is likely to occur (that is, holders 330 are not arranged at the top and bottom of the transmissive screen 300). Then, the holders 330 may be attached over the entire length of the right and left edges, as shown in FIG. 5(*a*), or holders 332 may be attached near the middle of the right and left edges, where moire fringing is likely to occur, as shown in FIG. 5(*b*). The distance from the Fresnel lens portion 310 to the lens array portion 320 in the periphery of the transmissive screen 300 is set to 300 μm.

In the third embodiment, at least one of the Fresnel lens portion 310 and the lens array portion 320 is preferably cambered, as in the second embodiment, to prevent moire fringing and enhance the resolution. As alternative cambering device, the holders 330 may be tapered so that at least one of the Fresnel lens portion 310 and the lens array portion 320 is cambered.

Figure 6:
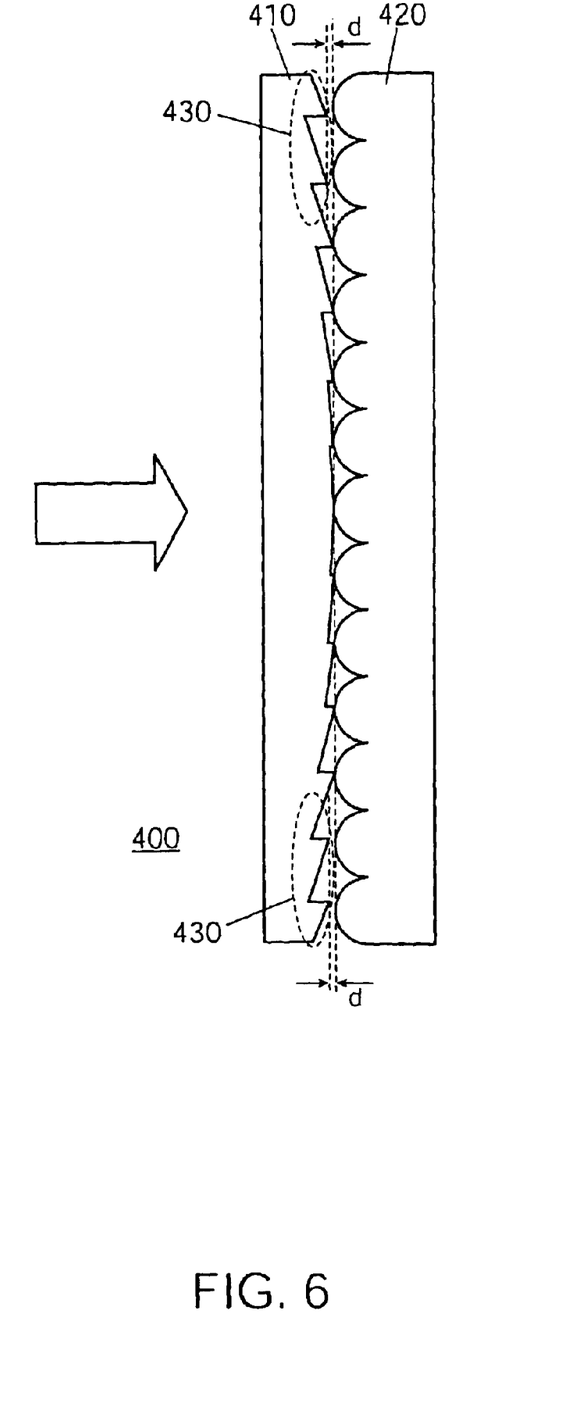
FIG. 6 is a sectional view of a transmissive screen according to a fourth embodiment of the present invention.

FIG. 6 is a sectional top view of a transmissive screen according to a fourth embodiment. As shown in FIG. 6, the transmissive screen 400 can include a Fresnel lens portion 410 having Fresnel-lens components on its light-exiting face and a lens array portion 420 facing the light-exiting face of the Fresnel lens portion 410 and having many lenticular lenses on its light-incident face. The transmissive screen 400 further includes a structure 430, as separate device, that the Fresnel lens surface is set back toward the light-incident face in the periphery of the transmissive screen 400.

Therefore, in the transmissive screen 400 according to the fourth embodiment, moire fringing in the periphery of the transmissive screen 400 can effectively be suppressed merely by setting back the Fresnel lens surface toward the light-incident face in a predetermined portion of the periphery of the transmissive screen 400.

The retreat distance d of the set back in the Fresnel lens surface is 300 μm. In order to retreat the Fresnel lens surface, a metallic mold for molding the Fresnel lens portion is formed so as to provide such specified shape of retreat in advance.

The region to be set back in the Fresnel lens surface may be provided around the entire periphery of the transmissive screen 400 so as to surround the screen 400, or may be provided only at the right and left edges of the screen 400 where moire fringing is likely to occur (that is, set back in the Fresnel lens surface is not arranged at the top and bottom of the transmissive screen 400).

A transmissive screen according to a fifth embodiment of the present invention is a modification of the transmissive screens of the first to fourth embodiments. In this modification, the respective lens array portions 120, 220, 320, and 420 in the first to fourth embodiments are provided with many microlenses instead of many lenticular lenses, thus improving the viewing-angle characteristics in the vertical direction. A transmissive screen with microlenses in the lens array portion has the Fresnel lens portion separated from the lens array portion at least in the periphery of the transmissive screen. This structure achieves uniform diffusion and moire-free images over the entire screen, and allows low-cost manufacturing of the transmissive screen.

The present invention is typically described with reference to the transmissive screens 100, 200, 300, and 400 of the first to fifth embodiments. However, it should be understood that the present invention is not limited to them, and various modifications are conceivable within the scope of the present invention. For example, the lens array portion 120 may have additional black stripes, a light-diffusing plate, or other microlenses on its light-exiting face.

A sixth embodiment of the invention is the rear projector 10 that is shown in FIG. 7, but can include one of the transmissive screens 100, 200, 300, and 400 according to the first to fifth embodiments, instead of the transmissive screen 40. In other words, the rear projector 10 according to the sixth embodiment includes a housing 50 that includes therein an optical projecting unit 20, a light-guide mirror 30, and one of the transmissive screens 100, 200, 300, and 400 according to the first to fifth embodiments.

As described above, the rear projector 10 according to the sixth embodiment includes one of the transmissive screens 100, 200, 300, and 400 according to the first to fifth embodiments which exhibit uniform diffusion and moire-free images over the entire screen and can be manufactured at a low cost. These features can allow for the production of a superior, low-cost rear projector with high image quality.

What is claimed is:

1. A transmissive screen, comprising:

a Fresnel lens portion having Fresnel-lens components on the light exiting face;

a lens array portion facing the light-exiting face of the Fresnel lens portion and having many lenses on the light-incident face thereof; and a separating device without a lens that separates the Fresnel lens portion from the lens array portion at least in a periphery of the transmissive screen.

2. The transmissive screen according to claim 1, the separating device being a flat transparent plate disposed between the Fresnel lens portion and the lens array portion.

3. The transmissive screen according to claim 1, the separating device being a spacer that separates the Fresnel lens portion from the lens array portion in the periphery of the transmissive screen.

4. The transmissive screen according to claim 1, the separating device being a holder that separates the Fresnel lens portion from the lens array portion in the periphery of the transmissive screen.

5. The transmissive screen according to claim 1, the separating device being constructed by setting back a Fresnel lens surface toward a light-incident face in the periphery of the transmissive screen.

6. The transmissive screen according to claim 1, the lens array portion including many lenticular lenses on the light-incident face thereof.

7. The transmissive screen according to claim 1, the lens array portion including a plurality microlenses on the light-incident face.

8. A rear projector comprising an optical projecting unit, a light-guide mirror, and the transmissive screen according to claim 1.

* * * * *